(No Model.)  3 Sheets—Sheet 1.
E. J. WILLIS.
PLANIMETER.
No. 542,511.  Patented July 9, 1895.
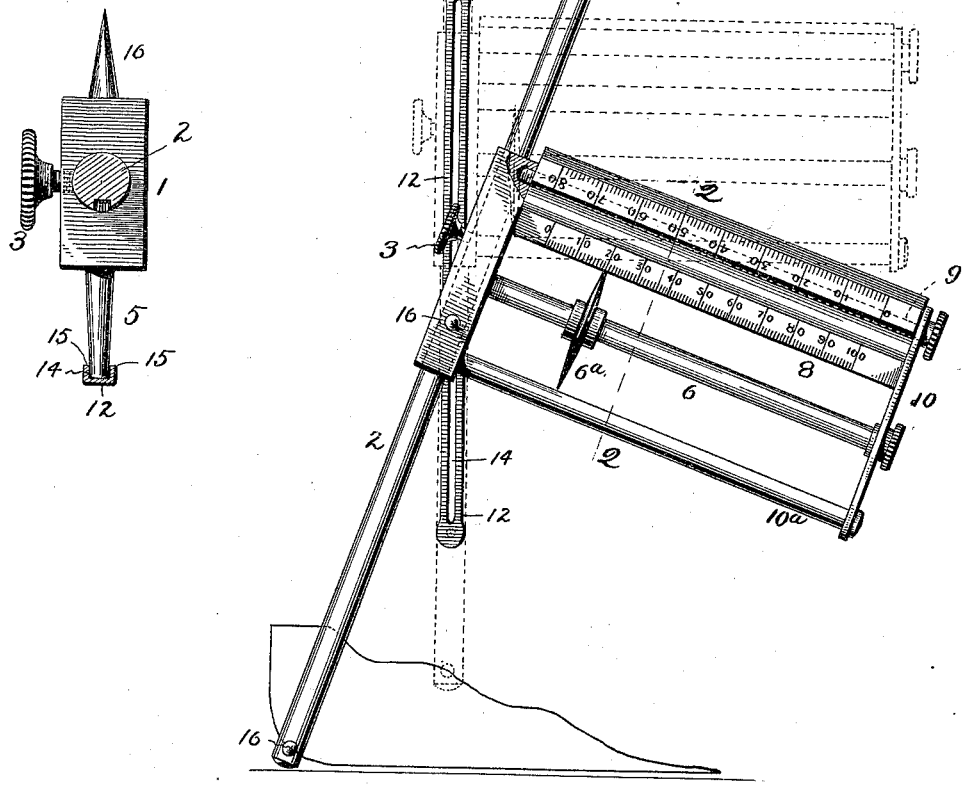
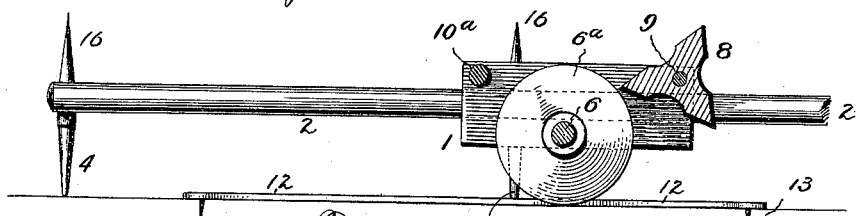
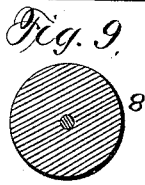
Witnesses
C. J. Williamson,
Alfred T. Gage.
Inventor
Edward J. Willis,
by W. T. Henderson
Atty.

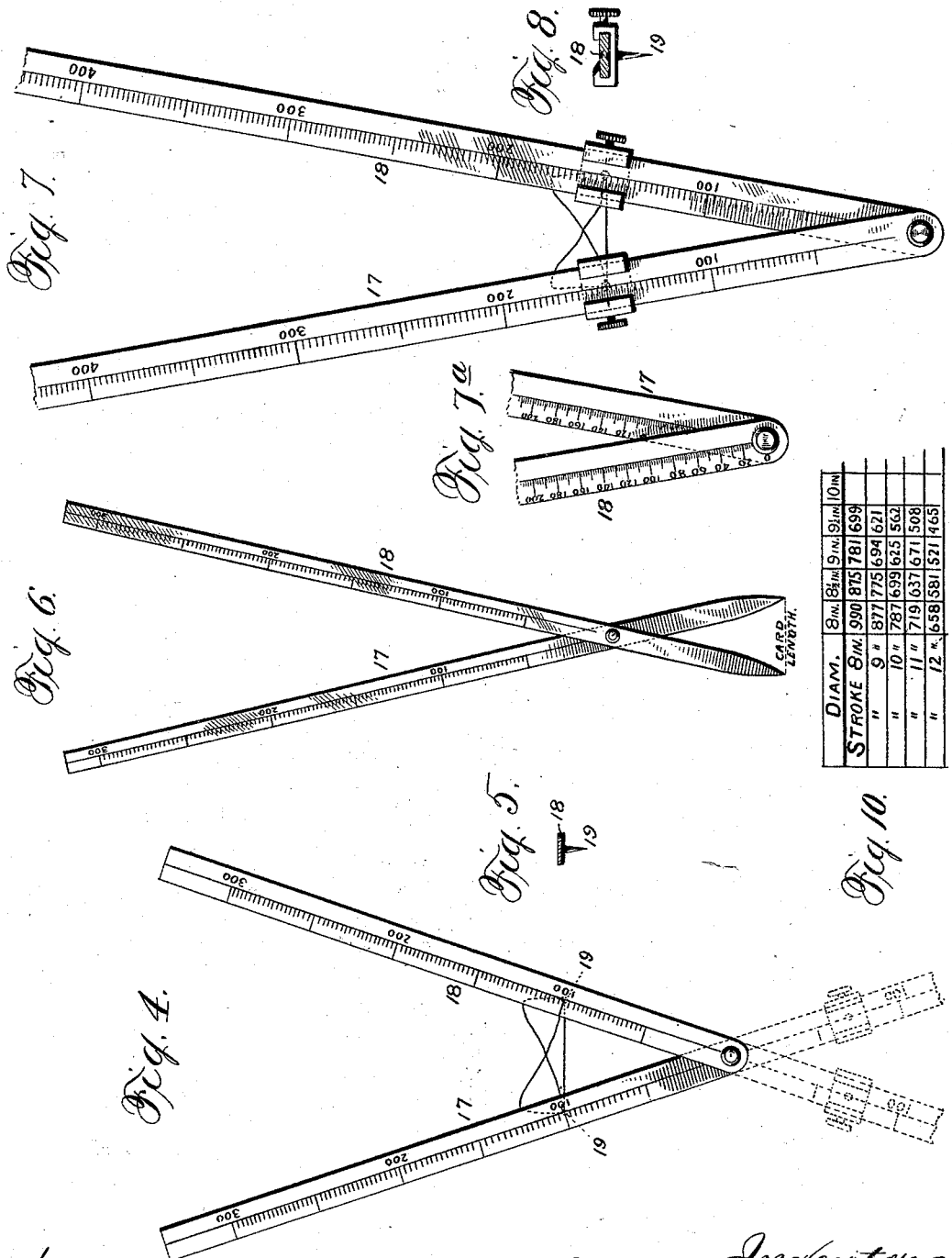

(No Model.)   E. J. WILLIS.   3 Sheets—Sheet 3.
PLANIMETER.
No. 542,511.   Patented July 9, 1895.
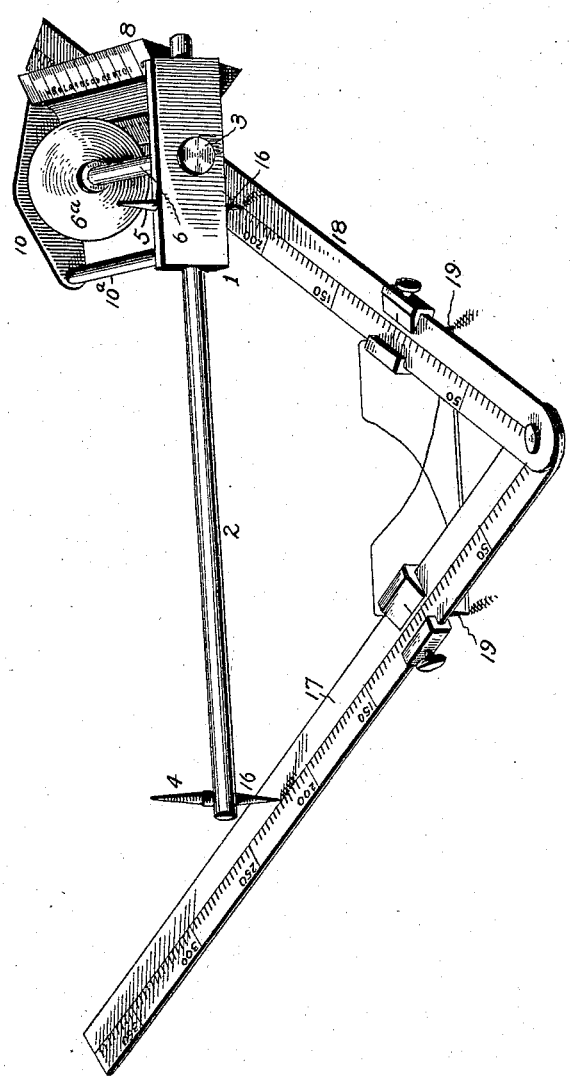

UNITED STATES PATENT OFFICE.

EDWARD J. WILLIS, OF RICHMOND, VIRGINIA.

PLANIMETER.

SPECIFICATION forming part of Letters Patent No. 542,511, dated July 9, 1895.

Application filed January 24, 1895. Serial No. 536,059. (No model.)

*To all whom it may concern:*

Be it known that I, EDWARD J. WILLIS, a citizen of the United States, residing at Richmond, in the county of Henrico and State of Virginia, have invented certain new and useful Improvements in Planimeters; and I do declare the following to be a full, clear, and exact description of the invention, such as will enable others skilled in the art to which it appertains to make and use the same, reference being had to the accompanying drawings, and to the figures of reference marked thereon, which form a part of this specification.

It is the purpose of my invention to provide a planimeter of simple and improved form, which may be used for measuring areas and to read the mean effective pressure and horse-power of a steam-engine, as shown by a steam-indicator diagram, the measurements being read directly from the scale attached without calculation of any kind.

My invention in this respect is an improvement upon that for which Letters Patent of the United States were issued to me upon the 13th day of November, 1894, No. 529,008.

It is a further purpose of my invention to provide a planimeter of this type with an attachment of extremely simple form whereby the horse-power of any engine may be determined and read directly from the scale attached to the instrument without resort to any mathematical calculation of any kind.

Finally, as my previous invention provided an instrument by which areas and mean effective pressure can be determined in any unit of measurement and from cards taken with any spring, my present invention in like manner enables the user to accomplish similar results and to ascertain horse-power from a steam-indicator card taken with any spring, thus avoiding the correction which would constantly be necessary whenever the instrument was applied to a card taken by a spring not identical with that adopted as the fundamental basis of organization—as, for example, where the instrument reads correctly only when used upon diagrams taken with a forty-pound spring.

To enable others skilled in the art to which my invention pertains to clearly understand and to make and use the same, I will proceed to describe said invention in detail, reference being had for this purpose to the accompanying drawings, in which—

Figure 1 is a plan view showing an improved form of planimeter of the type heretofore patented by me. Fig. 2 is a vertical section on the line $x\,x$ of Fig. 1. Fig. 3 is a vertical section showing the manner of guiding the fixed point of the instrument while following a steam-indicator diagram with the tracer. Fig. 4 is a plan view showing the attachment used in determining horse-power. Fig. 5 is a detail section showing the form of the points used on the attachment. Fig. 6 is a plan view showing a modified form of an attachment. Fig. 7 is a detail view showing a further form. Fig. 7$^a$ is a fragmentary view of the arms in Fig. 7, showing the reverse side with finer graduations for small engines and higher speeds. Fig. 8 is a detail section showing the adjustable point. Fig. 9 is a detail view showing a modification in the form of the interchangeable scale. Fig. 10 is a fragmentary view of a table designed for use with the planimeter and attachment. Fig. 11 is a plan view showing the planimeter and graduated arms in their operative relation to each other.

The reference-numeral 1 in said drawings indicates the frame of the instrument, which may consist of a plain rectangular housing provided with a suitable opening to receive and permit the longitudinal adjustment of the tracer-bar 2. A set-screw 3 locks the bar at any required point, its adjustment being made to cause a tracer or point 4, projecting downward from the lower face of the bar at or near its end, to approach or recede from a guide-point 5, which projects downward from the lower face of the frame 1 in line with the axis of the tracer-bar 2.

Projecting laterally from the frame 1 is a rigid shaft 6, arranged at a right angle with the tracer-bar and with the longitudinal line of the frame. Upon this shaft is mounted the measuring-wheel 6$^a$, which is capable of turning freely and traveling longitudinally from end to end of the shaft upon which it is so fitted. The periphery of the wheel is beveled or dressed off upon opposite sides to bring it to a thin edge not sufficiently keen to cut, but so sharply defined that it may be placed in accurate coincidence with the graduation of the scales used with the instrument. These scales may be interchangeable in the manner shown in my Letters Patent heretofore specified, some being graduated to the different springs with which the indicator-diagrams are taken, as well as to accord with the various units of measurement or metric system used in ascertaining areas. I prefer, however, to use the revoluble form of scale-bar containing a plurality of graduations, and having the following construction and arrangement.

I prefer to use as a revoluble scale-bar the forms shown in Figs. 1 and 9, consisting substantially of a scale-bar 8 of polygonal form in cross-section, and preferably, though not necessarily, triangular, its three faces representing the sides of an equilateral triangle. This scale-bar I mount upon an axis 9, parallel with the shaft 6, and in such position that, when revolved upon said axis, the several series of graduations will be brought successively into such position as to enable the setting and indications of the wheel $6^a$ to be accurately determined by means of said graduations, which will correspond with the different springs with which mean effective pressure indicator-diagrams are taken. In order to provide a support for the axis of the scale-bar, I attach a bracket 10 to the end of the shaft 6 and brace it by a bar $10^a$, projecting from the frame 1 and parallel with the shaft. If a triangular scale-bar is used I may place two different graduations on each of the three flat faces thereof adjacent to the edges, thus forming six different scales upon a single triangular scale-bar. I may also use a polygonal bar having any number of sides or flat faces with a different scale upon each polygonal face, or I may employ a circular bar having as many different scale-graduations as the cylindrical face will admit. As the various scales can be presented to the measuring-wheel by merely revolving the scale-bar, or by removing and reversing the bar and then revolving instead of removing one and substituting a separate graduated plate or scale, the advantage of this construction will readily be seen. In this form of the instrument, which, with the exception of the equilateral form of the interchangeable scales, does not differ materially from that shown in my Letters Patent heretofore mentioned, I may dispense entirely with the fulcrum-bar shown in said patent, substituting therefor its equivalent, which is a guide-strip 12, consisting of a straight or curved piece of metal or other suitable material which is provided with means for attaching it to the paper or card or to the flat surface on which the paper or card lies. This attachment may be effected in any suitable manner—as, for example, by points 13, which may form part of the strip or consist of ordinary thumb-tacks, passing through the apertures in the ends of the strip. A longitudinal guide-channel 14 is formed in or upon the strip, either by slotting the latter or by forming or attaching parallel ribs 15 thereon, the channel being of such width as to admit the point 5 on the frame and allow it to move therein. Both the tracer-point 4 and the guide-point 5 are provided with setting-points 16, which rise from the frame and the end of the tracer-bar, their sharp points being in the axial lines of the guide-point and tracer-point.

When used to determine the mean effective pressure of an indicator diagram, the scale used should correspond in its graduation with the spring used in taking the diagram. The instrument is then set to the atmospheric line of the card, or, in other words, to the card length, using for this purpose the setting-points 16. The tracer-bar 2, which is released to permit this adjustment, is then locked by the set-screw 3, the wheel is set at zero on the attached scale, and the guide-point 5 is placed in the channel 14 of the guide-strip, which is arranged substantially in parallelism with the length of the card. The tracer-point is then caused to follow the diagram from any point thereon, the direction of movement being preferably toward the right. When the tracer-point arrives at the point of departure, the wheel, which should remain at all times in surface contact with the paper or card, will be found standing at a point on the attached scale which will accurately indicate the mean effective pressure.

The equation upon which this form of instrument is organized is similar to that in my Letters Patent No. 529,008. For example, if A be taken to represent the superficial area of a diagram, M to denote the movement of the measuring-wheel, and L the length to which the tracer-bar is set, which will be the length of the diagram, then $A = M \times L$, and the mean effective pressure will equal $\frac{A}{L}$. Representing this pressure by the letters M. E. P., the equation will be $M.E.P. = \frac{A}{L}$, or, clearing the denominator, $A = (M.E.P.)L$; then substituting, $(M.E.P.)L = M \times L$, whence $M.E.P. = M$. Thus the mean effective pressure is equal to the movement of the wheel over the scale, which is graduated to indicate pounds per square inch by graduations conforming to the spring used in taking the diagram. Thus a forty-pound spring will require a scale having forty graduations to the linear inch, &c.

The horse-power of an engine being a constant times the mean effective pressure, if the card length be divided by the constant and if the tracer-bar of the planimeter be adjusted to bring the points the quotient's distance apart, the instrument will give the horse-power direct from the attached scale, the latter being selected to correspond with the spring used in taking the diagram, as heretofore explained. The equation will read $M.E.P. \times \frac{\text{card length}}{\text{tracer-bar length}} = H.P.$, or horse-power; or, in other words, $H.P. = M.E.P. \times \text{constant}$, the constant being $\frac{\text{card length}}{\text{tracer-bar length}}$. For example, in a twelve-inch-by-eighteen-inch engine, at one hundred and fifty revolutions per minute, (or r. p. m.,) the constant $= \frac{1\frac{1}{2} \times .785 \times 12 \times 12 \times 150}{33,000} = .77$. If the cards used were 4.24 inches in length, then, in figures, $\frac{4.24}{.77} = 5.5$ inches, which would be the proper distance of separation for the tracer-point and guide-point.

To avoid all necessity for making similar calculations in each case, and to secure increased accuracy, I have devised an attachment to the type of planimeters shown and described, which consists of two graduated arms 17 and 18, pivotally connected and provided with points 19. These points are set at the same distance from the point of pivotal connection upon each arm, and may be either fixed or adjustable. The point of pivotal connection also may be either at the ends of the arms, as shown in Figs. 4 and 7, or at a suitable point between the opposite extremities, as indicated by dotted lines in Fig. 4. I prefer, however, to use the fixed points and the simpler form of pivotal connection, though my invention is compatible with either form. When the pivotal connection is located between the ends of the arms, the points 19 may be placed on either side of the pivotal point. This attachment is used to set the points 16 16 of the planimeter to an adjustment represented by the quotient of $\frac{\text{card length}}{\text{constant of engine}}$, by which the instrument is made capable of determining the horse-power and enabling it to be read directly from the scale without any mathematical calculation whatever. To accomplish this readily, tables are provided to accompany each attachment, giving the diameters, length of stroke, and revolutions per minute for the different sizes of engines, and indicating the points upon the graduated arms of the attachment to which the points of the planimeter must be adjusted in each case—that is, the tables will consist of the reciprocals of sundry engine constants. This adjustment is made after the arms of the attachment have been opened far enough to cause the points 19 to register with the ends of the atmospheric line of the diagram. While in this position the points of the planimeter are adjusted to the graduations on the arms of the attachment which correspond to the particular case.

To illustrate, the table will be substantially as follows:

| Revolutions per minute. | Diameter, ten inches. | | | |
|---|---|---|---|---|
| | Stroke. | | | |
| | Ten-inch. | Eleven-inch. | Twelve-inch. | Thirteen-inch. |
| 205 | 246 | 224 | 205 | 189 |
| 210 | 241 | 218 | 200 | 184 |
| 215 | 235 | 213 | 195 | 180 |

Now, using the atttachment with fixed points, as Figs. 4 and 6, with a diagram taken with a fifty-pound spring, from a ten-inch-by-eleven-inch engine, at two hundred and ten revolutions per minute, the points of the planimeter would be set to the graduations "218" on the arms of the attachment, the latter having previously been adjusted by setting its points 19 to the distance apart measured by the length of the atmospheric line of the diagram. The fifty-pound scale being attached to the planimeter, the diagram is then followed as before, and the horse-power will be read directly from the scale.

If adjustable points on the arms should be used instead of fixed points, as by dotted lines, Fig. 4, and full lines, Fig. 7, a table in principle the same as illustrated in Fig. 10 of drawings would be employed provided the adjustable points moved along arms with graduations the same as on the arms for settings. In such case the adjustable points would be set on arms to reading corresponding to revolutions per minute of engine. The points 19 19, Fig. 7 or 4, would be set on card to length of atmospheric line, and the points 16 16 of planimeter would be set on the arms to reading called for by the table illustrated in Fig. 10. The wheel would read horse-power because the tracer-arm would thereby be set to card length divided by the constant of the engine. Thus, suppose a card from an engine nine and one-half inches in diameter and twelve-inch stroke at two hundred revolutions. First, set pointers 19 19, Fig. 7, to read "200" on each arm. Then set points 19 19 to ends of atmospheric line. Looking in table, Fig. 10, for the setting for this engine it is noted to be "465." Therefore set points 16 16 of the planimeter to "465" on each arm. Then going over the card with planimeter with scale turned next, which corresponds with indicator-spring would be read the horse-power direct from the card.

It is preferred to have the scale used on the dotted extensions shown in Fig. 4 the same as scale on the setting-arms; but if the scale should be different, then the tables would have to be some percentage of what the tables would otherwise be. For illustration, if the scale in the dotted indicated arms should be twice as fine as that on the setting-arms, the figures of the tables would be one-half of those otherwise given. The principle would be the same, the difference being only in the percentage, and so, too, if the points in Fig. 6 were not just one hundred long, there would be a difference in percentage of the figures of the table to be provided for, which is obvious to the skilled in the art.

The purpose of making the points 19 adjustable is to enable them to be adjusted as to speed and thus reduce the extent of the tables. In order to give the instrument considerable range and at the same time have it compact and of portable size, the arms are preferably graduated on both sides, one side being coarsely graduated for large engines and slow speeds, as illustrated in Fig. 7, (which graduations may be about sixteen to the inch and suitable for speeds under two hundred,) and the other side finely graduated, as illustrated in Fig. 7ª, for small engines and high speeds, (which graduation may be about sixty to the inch and suitable for speeds over two hundred.) This enables one table to be used instead of numerous tables for the same purpose.

It will be understood that this attachment may be used with any mean-effective-pressure planimeter having an adjustable tracer-arm, but without the interchangeable scales the instrument will give correct readings for only a single spring, and corrections will be needed in all other cases. My invention, by providing scales graduated to every spring, wholly avoids this necessity.

Any desired scale may be used on the adjustable arms of the attachment, but the divisions of the scale should be regular and the line on which the graduations are made should pass through the center of the hinge or pivotal connection of the arms, so as to insure the proper proportionality in the adjustment of the arms.

What I claim is—

1. A planimeter having an adjustable tracer-bar and a measuring wheel having rotary and longitudinal movement on a fixed shaft, and a guide point upon the frame adapted to move in a fixed guide channel, substantially as and for the purposes described.

2. A planimeter having an adjustable tracer-bar, a measuring wheel having rotary and longitudinal movement upon a fixed shaft, and a guide point on the frame, in combination with a fixed guide consisting of a strip having a channel in which the guide point moves, substantially as and for the purposes described.

3. The means for setting a planimeter to enable horse-power to be read direct from the planimeter, said means comprising a planimeter with an adjustable tracer-bar, and an attachment consisting of graduated arms pivotally connected and capable of separation by the pivotal adjustment of the graduated arms to set the same to the card length of an indicator diagram, the line on which said graduations are made passing through the center of the hinge of the arms, substantially as and for the purposes described.

4. The means for setting a planimeter to enable horse-power to be read direct from the planimeter, said means comprising a planimeter having an adjustable tracer-bar, and an attachment composed of two graduated arms pivotally connected and provided with points adapted to be set to the atmospheric line of an indicator card, the graduations on said arms serving to set the tracer-bar to a reading which will enable the horse-power to be read from the planimeter after the tracer-bar has traced the lines of the indicator card, substantially as and for the purposes described.

5. The means for setting a planimeter to enable horse-power to be read direct from the planimeter, said means comprising a planimeter having an adjustable tracer-bar and adapted to receive interchangeable scales, and an attachment composed of two graduated arms pivotally connected and each provided with a point adapted to be set to the atmospheric line of an indicator card, substantially as and for the purposes described.

6. The means for setting a planimeter to enable horse-power to be read direct from the planimeter, said means comprising a planimeter with an adjustable tracer-bar, and an attachment composed of graduated arms pivotally connected together and each provided with an adjustable point arranged upon one side of the pivotal point of connection of said arms, substantially as and for the purposes described.

7. The means for setting a planimeter to enable horse-power to be read direct from the planimeter, said means comprising a planimeter having an adjustable tracer-bar, and an attachment consisting of two graduated arms adapted to be set to the card length of an indicator diagram, the line on which said graduations are made passing through the center of a hinge of the arms and the graduations serving to set the tracer-bar to reading corresponding to the reciprocals of sundry engine constants as ascertained from a table of such constants, substantially as and for the purposes described.

8. The means for setting a planimeter to enable horse-power to be read direct from the planimeter, said means comprising a planimeter having an adjustable tracer-bar, and an attachment consisting of two pivoted arms graduated on one side for large engines and slow speeds and on the other side for small engines and higher speeds and adapted to be set to the atmospheric line of an indicator diagram, the line on which said graduations are made passing through the center of a hinge of the arms and the graduations serving to set the tracer-bar to reading corresponding to the reciprocals of sundry engine constants as ascertained from a table of such constants, substantially as and for the purposes described.

9. The combination with a planimeter having a measuring wheel which is capable of rotation and longitudinal movement upon a fixed shaft, of a revoluble scale bar mounted on an axis parallel with the shaft of the wheel and having a plurality of scale graduations, substantially as and for the purposes described.

10. The combination with a planimeter having a measuring wheel capable of revolution and longitudinal movement on a fixed shaft, of a scale bar of polygonal form in cross section, revoluble on a bar or axis, arranged in parallelism with the shaft carrying the measuring wheel, substantially as and for the purposes described.

11. The combination with a planimeter having a measuring wheel capable of revolution and longitudinal movement on a fixed shaft, of a triangular scale bar, revoluble on an axis parallel with the shaft carrying the measuring wheel, the flat faces of said scale bar being differently graduated, substantially as and for the purposes described.

In testimony whereof I affix my signature in presence of two witnesses.

EDWARD J. WILLIS.

Witnesses:
BARTON H. CAMERON,
ARTHUR WINN.